June 18, 1957 — A. RONNING — 2,796,553
COMPOUND THERMAL SWITCH
Filed March 16, 1953
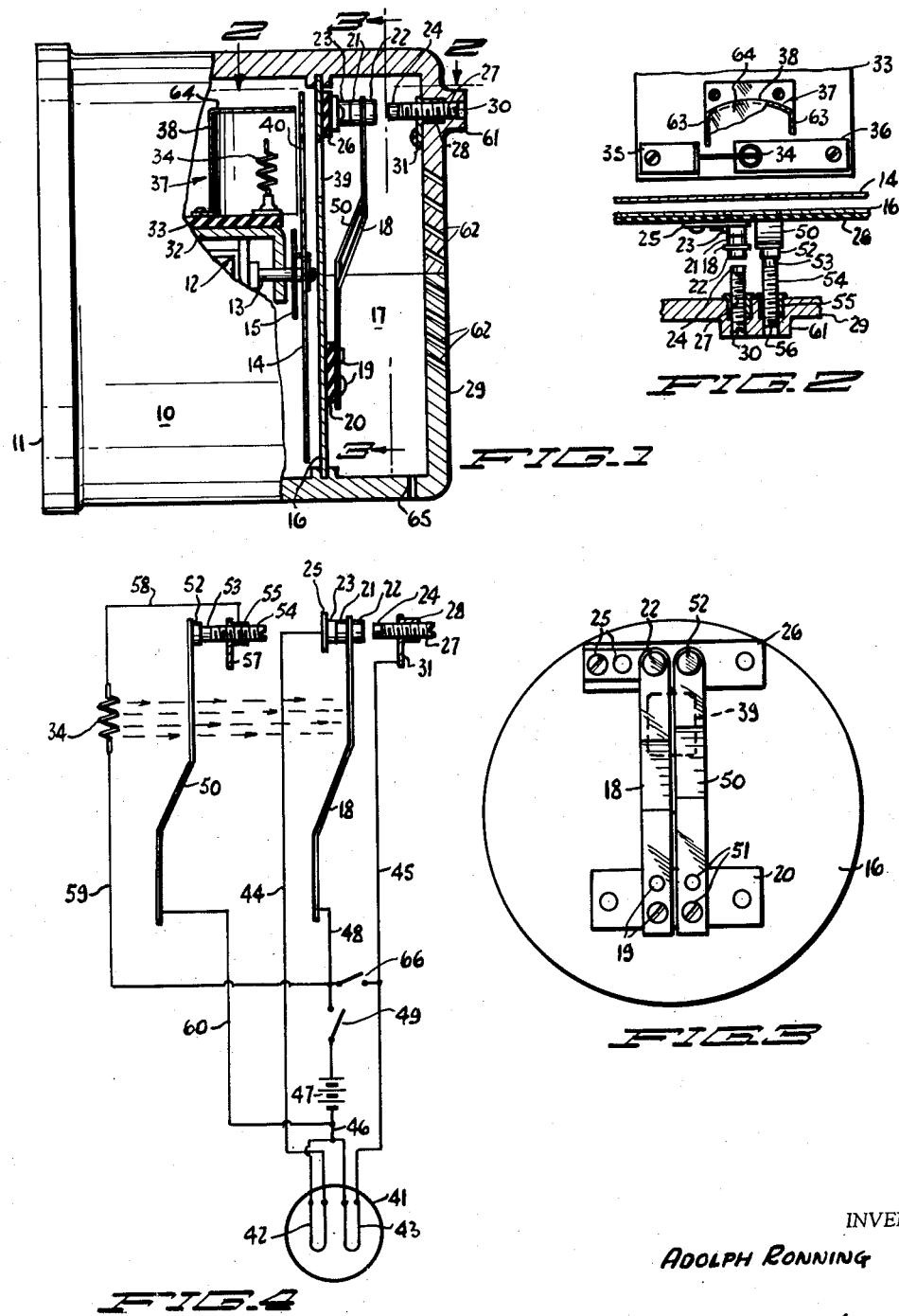
INVENTOR
ADOLPH RONNING
BY Carlsen & Hogle
ATTORNEYS 2,796,553

COMPOUND THERMAL SWITCH

Adolph Ronning, Minneapolis, Minn.

Application March 16, 1953, Serial No. 342,655

13 Claims. (Cl. 315—83)

This invention relates to improvements in compound thermal relays or heat sensitive switches.

In the electrical control field there are numerous applications for a simple and readily controllable switch or relay, for controlling a circuit in response to a change in a condition, and according to my invention the relay itself is a heat sensitive or thermally operative one, operating in conjunction with a heat source and a condition responsive adjustable means which selectively exposes the relay to the heat source, or isolates the two. As one specific example of the need for such condition responsive relays there may be cited the headlights of a motor vehicle, which have separately energizable high and low, or so-called dim and bright, filaments or beams. Safe night driving requires that drivers of approaching vehicles dim their lights, that is shift from high to low beams, but all too often they neglect to do this so that they are blinded by the glare and an accident results. However, it is perfectly possible to provide vehicles with automatic control switches or relays sensitive to the lights of oncoming vehicles to automatically shift from high to low beams, and were all vehicles so equipped this dangerous problem would be solved once and for all. In my prior Patent No. 2,237,579 issued April 8, 1941, I have disclosed a light sensitive relay system for this purpose and the same includes a light sensitive element that, upon exposure to the lights of the approaching vehicle, generates electrical energy which is then utilized to actuate a small electric motor. Said motor positions or adjusts a member which acts as a shutter and selectively exposes a heat sensitive relay to a heat source, with the relay so connected in the headlight circuit that when heat is applied the circuit is opened to the high or bright filaments and closed to the low or dim filaments.

The structure and system disclosed in the patent are particularly suitable to use as an automatic headlight dimmer for reasons set out therein, but there are certain problems which arise in all such controls and which the present invention has as its primary object to solve. First of all, the headlights of the vehicle equipped with the control must be shifted to low beam at the proper time, with the approaching vehicles not too far apart and not too near to each other, and secondly the return from low to high beam as the vehicles pass each other must be properly timed with the same considerations in mind. In other words, the sensitivity of the control must be properly chosen and the lag in the operation of the relay must be precisely adjustable and controlled. Furthermore, the increased load on the battery of the vehicle as represented by this added control must be as low as possible.

In accordance with the primary object of this invention I particularly attack and solve the problems of proper lag in the operation of the heat sensitive relay itself. In the patent the heat source operates continuously so long as the control is in operative condition. This is undesirable for two reasons, the first and most important of which is the fact that the movable element of the relay is continuously exposed to heat when light rays are energizing the light sensitive element so that the temperature builds up to a point where there is considerable lag in the return of the said movable element once the application of heat is removed. Secondly the continuous energization of the heat source is a wasteful drain upon the battery of the vehicle. I therefore provide a second heat sensitive relay or switch which is exposed to the heat source simultaneously with the exposure of the relay controlling the headlights, and connect this second relay in the energizing circuit for the heat source in such fashion that as the heat is applied the second relay will open the energizing circuit. By the proper proportioning of the characteristics and responses of the two relays I then am able to regulate the heat effective on the relay controlling the headlights, to the point where it is just enough to hold this relay in the proper condition. Thus the build-up in temperature and resulting difficulty in adjusting or controlling the lag in the return action of the relay is eliminated, as will be understood.

A further object of the invention is to provide added improvements and refinements in the thermal relay system, important among which is the provision of means whereby the low or dim filaments of the headlights may be continuously energized under control of a separate manual switch, with the automatic relay system merely adding the illumination of high or bright filaments to these low beams as conditions permit. This constant low beam system may be desirable, as a safety factor, since there could then be no interval, however minute, when neither the high nor low filaments are energized as is presently the case. In addition the highway surface in advance of the vehicle would be more uniformly lighted and any tendency for there to be a blind spot immediately in front of the vehicle would be eliminated. It is true that battery drain would be increased in this case but this would be offset by the intermittent operation of the heat source as now provided by my invention.

These and other more detailed and specific objects will be disclosed in the course of the following specification, reference being had to the accompanying drawings, in which—

Fig. 1 is a side elevation, partially broken away and in section, of an assembly similar to that disclosed in my prior patent previously identified but with changes made therein in accordance with the present invention.

Fig. 2 is a fragmentary horizontal sectional view taken substantially along the line 2—2 in Fig. 1.

Fig. 3 is an elevational view of the insulating partition plate or wall upon which the relays are mounted, as viewed substantially along the line 3—3 in Fig. 1.

Fig. 4 is a schematic wiring diagram of the electrical circuit embodying the headlights, the two relays or switches, the heat source and the controls for these elements.

Referring now more particularly and by reference characters to the drawing, I have shown in Fig. 1 thereof an assembly quite similar to that of Fig. 8 of my prior patent and the same comprises a casing or housing 10 preferably of so-called "plastic" or the like, having an open frontal face 11 through which is exposed the light sensitive element (not here shown) to the headlights of approaching vehicles. As clearly pointed out in the patent the exposure of this light sensitive element to such headlights generates an electromotive force sufficient for the operation of what may be described as a shutter motor, only partially disclosed here and designated generally at 12. The motor includes a shaft 13 on the rear end of which is mounted an adjustable member 14 acting as a condition-responsive means for selectively exposing the heat sensitive switch to a heat source. In the structure here under consideration said member 14 takes the form of a circular, revolving shutter which is rotated from an initial position, as light strikes the aforesaid light sensitive element, by the actuation of the motor 12. When the light no longer strikes the light sensitive element the electromotive force effective on the motor is removed and a hair spring 15 returns the shutter to its starting position. In common with the structure of the patent I have herein also shown a partition wall or isolating plate 16 as dividing the interior of the casing 10 into front and rear compartments, said plate being located immediately behind the adjustable member 14. The heat sensitive relay for the circuit to be controlled is located in the rear compartment 17, behind the aforesaid plate 16, and consists of a bimetallic movable element or arm 18 secured at its lower end at 19 upon a terminal strip 20 of electrically insulating material and provided at its upper end with opposed contacts or points 21 and 22 for selective electrical engagement with a fixed contact 23 and adjustable contact 24. The fixed contact 23 is secured at 25 to an upper terminal strip 26 of electrically insulating material, whereas the adjustable contact 24 is located upon the end of an adjustment screw 27 which is threaded into a metal bushing 28 imbedded in the adjacent rear wall 29 of the casing 10. The screw 27 has the usual kerf 30 for adjustment while the bushing 28 is provided with a terminal 31 for making electrical connection to the contact point 24. The terminal strips 20 and 26 are suitably secured to the partition plate 16 which serves as a support, and it will be understood that the upper and lower designations, as used herein, are for convenience in description only and are not limiting.

Forming a part of the motor 12 is a frame 32 upon which there is mounted an electrically insulating base 33 for the support of a heat source 34 located just forward of the member 14. As here shown this heat source takes the form of a coil or filament of resistance wire, the opposite ends of which are electrically connected to terminals 35 and 36 mounted upon the base 33, as seen in Fig. 2. A reflector 37 is also mounted upon the base 33 and has a curved, forward end 38 properly shaped and spaced with respect to the heat source 34 to reflect and concentrate the heat radiated thereby in a rearwardly directed beam toward the movable element 18 of the switch. The plate 16 has an opening 39 to pass this beam of radiant heat and as the member 14 is rotated by the electromotive force developed when the light sensitive element is impinged by light waves, another opening 40 in said member moves into registry with the opening 39 to expose the switch to the heat from the source 34.

The movable element or arm 18 of the relay is, as stated, bimetallic and is conventionally composed of strips of metals having differing coefficients of expansion. In the structure here shown the arm 18 is so stressed initially that the contacts 21 and 23 are normally maintained in engagement, but upon the application of heat the uneven expansion of the metals will cause the arm to flex in a rearward direction at its upper end to open contacts 21—23 and close contacts 22—24. In Fig. 4 this portion of the system is shown, for example, as controlling the energization of the filaments in a headlight 41, which has a high or bright filament 42 and low or dim filament 43. For this purpose the contacts 23 and 24 are connected by conductors 44 and 45 to corresponding terminals of the filaments 42 and 43, while the remaining terminals of these filaments are tied together and connected by conductor 46 to one terminal of the vehicle battery 47. The remaining terminal of the battery is then connected by a conductor 48 to the arm 18 of the relay, so that the selective electrical engagement of the contacts 21—23 and 22—24 will close the circuits to the filaments 42 and 43 respectively. For convenience I have herein shown a manually operative master switch 49 as located in the conductor 48 for the proper exercise of manual control over operation of the system and, of course, in the ordinary vehicle there will be another headlight, with proper parallel connections of the respective filaments 42—43.

The operation of the thermal relay system will be readily understood from the foregoing description, as well as from the more complete description of my prior patent, and it will be readily appreciated that there are a number of factors which influence not only the sensitivity of the relay but also the lag when the same returns to its normal position after having opened the contacts 21—23 under the control of the headlights of an approaching vehicle. I am here particularly concerned with the lag in this return action, as it will be hereinafter described. It will be readily appreciated that once the shutter member 14 is adjusted to permit the beam of radiant heat to pass through the openings 39—40 the application of heat to the relay arm 18 will be continued until the condition controlling the member 14 changes, that is, until the oncoming vehicle has passed. As a result the temperature of the relay arm 18 is built up considerably beyond a degree which is necessary to move the arm from its normal position and close the contacts 22—24, and when the heat is removed by the interruption of the radiant beam there will be a measurable lag in the return action of the arm until it cools down to the point where it will flex back to its initial position. The adjustment of the contact 24 by the screw 27 will have a bearing upon the operation, but according to my present invention I provide for the control of the intensity of the radiant beam of heat to limit or prevent this undesirable build-up of temperature in the relay arm 18 as will now be described.

Located immediately alongside the first relay arm 18 is a somewhat similarly arranged second relay arm 50 and the same is secured at its lower end at 51 to the terminal strip 20, while at its upper end and upon the rear face thereof there is provided a contact 52. As stated, the respective relay arms 18 and 50 are located immediately alongside each other and it will be observed in Fig. 3 that they are also centered with respect to the opening 39 through which the radiant beam of heat passes through the plate 16, so that both of the arms will be subjected to the heat simultaneously. Cooperating with the contact point 52 is an adjustable contact 53 and the same is carried upon a screw 54 threaded through a metal bushing 55 imbedded in the rear wall 29 of the casing. Here again the screw 54 has the usual kerf 56 and a terminal 57 for making electrical connection to the contact 53. Referring for the moment to Fig. 4 the energizing circuit for the heat source 34 includes a conductor 58 connected to one terminal of the said heat source and to the bushing 55 and thence to contact 53. From the other terminal of the heat source a conductor 59 leads to the conductor 48 and thus may be connected, under control of the manual switch 49, to one terminal of the vehicle battery 47. The circuit is then completed by a conductor 60 connecting the arm 50 to the remaining terminal of the battery 47.

The second relay arm 50 is also bimetallic but in this case the relationship of the metals having the high and low coefficients of expansion are reversed with respect to that of the first relay arm 18. This difference is shown by the opposite shade lines in both Figs. 1 and 4 of the drawing. The switch arm 50 is initially stressed to normally maintain the contacts 52 and 53 in engagement and thus the energizing circuit between the battery 47 and the heat source 34 will be closed whenever the manual switch 49 is closed, and as the condition controlling the relay arm 18 changes and the beam of radiant heat is directed upon the two arms 18 and 50 the first relay arm 18 will operate as aforesaid to close contacts 22—24. But in addition the switch arm 50 will be influenced by the heat in an opposite direction such as to tend to open the contacts 52—53 and thereby interrupt the energizing circuit for heat source 34. The proper proportioning of the metals and the responsiveness of the two arms 18 and 50 will make it readily possible to bring about a condition in which the initial application of the heat to relay arm 18 will move it to the desired position and the same will remain in that position while the relay arm 50, being more sensitive to heat, will intermittently open the energizing circuit to the heat source 34 and reduce the heat radiated thereby. Thus by proper design and adjustment the heat effective upon the relay arm 18 may be controlled to the point where it will first very quickly move the arm and will then be just sufficient to hold the arm in the desired position. In fact the heat may be held below a point which would cause the temperature of the relay arm itself to build up unduly, as previously described, which build-up requires an interval of time for the heat to be dissipated before the relay arm can return to its initial position. Here again the adjustment of contact 53 by the screw 54 will be important for best operation and it will be noted that the kerfed ends of both of the screws 27 and 54 are concealed within an enlargement 61 of the rear wall 29 of the casing, to prevent tampering once the screws are properly and precisely adjusted.

In effect what is secured is a differential thermal response in the two relays to prevent overheating of the relay controlling the light circuit and it is further desirable in this connection, since any surplus heat must be dissipated, to provide the rear wall 29 of the casing with vents to atmosphere such as shown at 62. It is also desirable for the plate 16 to be of heat insulating material so that the ambient temperature in the compartment 17 will be as little influenced as possible by the heat generated forward of the plate 16 by the heat source. Further, in order to confine the heat, the aforesaid reflector 37 is provided with rearwardly extending shrouding made up of side walls 63 and an upper wall 64 which terminate as closely as practical to the forward face of the member 14. It may be also desirable to coat this entire reflector and shrouding with heat insulating material. What is desired, of course, is the maximum concentration of the radiant heat upon the relay arms and a minimum dispersion of heat throughout the interior of the casing and I regard these improvements over the structure shown in my prior patent as valuable in this connection. Inasmuch as the vents 62 open the compartment 17 to atmosphere, it is desirable that they be inclined as shown to prevent foreign matter or moisture from entering the casing and also I provide a drain opening 65 in the lower wall to permit moisture to escape.

In any case there must be a momentary interruption of the circuits to both high and low filaments 42 and 43 as the relay functions and this interval, however minute, may be undesirable. I therefore provide what may be referred to as a constant low beam circuit having a switch 66 of the manually operative type which is connected between the conductors 45 and 48 and therefore is in parallel with the contacts 22—24 of the main thermal relay. When this switch 66 is closed the circuit to the low filament 43 will remain closed at all times and the actuation of the thermal relay will simply add the illumination of the high filaments 42 to that provided by the low filament 43 or, when required, will open the circuit to the high filaments 42. In this case the thermal relay becomes a single-pole single-throw device and the contacts 22—24 might be entirely dispensed with, such variation being regarded as within the scope of my invention.

While I have herein described my invention as applied to the control of the headlights of a motor vehicle, it is to be understood that I do not limit myself to this specific use and a thermal relay with controlled heat source such as here provided may well have many other applications in the electrical field.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A device of the character described for controlling an electrical circuit, comprising in combination, a heat sensitive relay connected in said circuit, a source of heat for actuating the relay, a separate electrical circuit for said heat source, controllable means for selectively shielding the relay from or exposing it to said heat source, and a separate heat sensitive means operative by exposure to said heat source to interrupt the heat source circuit and reduce the intensity of the heat to which said relay is exposed.

2. A compound heat sensive relay for controlling an electrical circuit, comprising in combination, a first relay connected in the circuit and having a moving element actuated from one position to another by exposure to heat, a heat source and an electrical circuit for energizing said source, an adjustable means for varying the exposure of said moving element of the first relay to the heat source, and a second relay connected in the energizing circuit for said heat source and also having a moving element actuated by exposure to the heat from the source for interrupting the energizing circuit.

3. For controlling an electrical circuit, the combination comprising a first thermal relay connected in the circuit and operative to affect the circuit upon exposure to heat, an electrically operative heat source and an energizing circuit therefor, a condition responsive adjustable element for selectively exposing the first relay to the heat source, and a second thermal relay connected in the energizing circuit and simultaneously exposed by said adjustable element to the heat source for regulating the intensity of the heat developed by said source.

4. For controlling an electrical circuit, the combination comprising a first thermal relay connected in the circuit and operative to change the circuit upon exposure to heat, an electrically operative radiant heat source and an energizing circuit therefor, a condition responsive adjustable element for selectively exposing the first relay to the heat source, and a second thermal relay connected in the energizing circuit and so located in proximity to the first thermal relay so that both will be simultaneously exposed to the heat source whereby said second relay will control the energization of the heat source.

5. For an electrical circuit control which includes a heat sensitive relay connected in said circuit, a radiant heat source for operating the relay and a condition responsive adjustable element for selectively exposing the switch to said heat source, the improvement which consists in an energizing circuit for electrically operating said heat source, and a second heat sensitive relay connected to control said energizing circuit and operatively arranged for exposure to the heat source and control of the intensity of the heat radiated thereby.

6. A compound thermal relay of the character described for controlling an electrical circuit, comprising in combination, a source of radiant heat, an energizing circuit for electrically actuating the heat source, a first thermal relay having a bimetal arm and contacts for controlling an electrical circuit, means for selectively exposing said arm to heat radiated from said heat source, a second thermal relay having a bimetal arm and contacts controlling the energizing circuit for the heat source, and the arm of said second relay being operative when exposed to heat radiated by the heat source to periodically open the energizing circuit.

7. For controlling separate electrical circuits one of which circuits includes a source of radiant heat, a pair of bimetallic relay arms having contacts connected in the respective circuits, means for focusing the heat radiated by said source upon the pair of arms to actuate the arms and control said circuits, and one of said arms being operative to interrupt the focusing of the heat on the arms.

8. For controlling an electrical circuit, a bimetal relay arm and contacts connected in the circuit, said arm being operative on the application of heat to a certain degree to move from a first position to a second position to control the circuit, means including a heat source for selectively applying heat to the arm, and means operative by the heat source for controlling the operating temperature of said heat source and reducing the heat effective on the arm, once it has reached its second position, to a temperature just sufficient to hold the arm in that position.

9. For controlling an electrical circuit, a compound thermal relay comprising in combination, a first bimetal relay arm movable from a normal position to a second position by the application of heat and said arm having contacts operative in the circuit to be controlled, an electrically operative source of radiant heat and means for selectively directing the heat upon said arm, an energizing circuit for the heat source including a source of electrical energy, a second bimetal relay arm having contacts normally closing the energizing circuit to the heat source, said second relay arm being exposed to heat simultaneously with the first relay arm and characterized in that it will be influenced by the heat to open the contacts in the energizing circuit when the heat effective on the first relay arm rises beyond the point necessary to hold the same in said second position.

10. For controlling an electrical circuit, a thermal relay comprising an electrically operated source of radiant heat, a movable relay arm having contacts connected in said circuit, means for selectively directing heat from said heat source upon the arm, the said arm being bimetallic and operative when exposed to said heat and brought to a certain temperature to move from one position to another, and means operative by the heat source to reduce the effective intensity of the heat radiated by the heat source, once the arm has been brought to said certain temperature, to a point where the arm will remain at that temperature and will therefore return to its starting position with a minimum lag when the direction of heat against the arm is halted.

11. In a compound thermal relay for controlling an electrical circuit, a casing, a heat insulating wall in the casing dividing same into first and second compartments and said wall having an opening, and electrically operative source of radiant heat in the first compartment, an energizing circuit for said heat source, a shrouded reflector enclosing said heat source on all sides except one which opens toward said opening to direct a beam of radiant heat through the opening and into said second compartment, a pair of bimetal thermal relay arms in said second compartment both exposed to and operated by heat from said opening and one having contacts controlling the electrical circuit and the other having contacts controlling the energizing circuit for the heat source, and means for selectively interrupting the passage of heat through said opening, the said bimetal arms having differing responsiveness to the heat whereby the arm controlling the energizing circuit will periodically open that circuit to prevent the build-up of temperature in the other arm beyond the point necessary to operate same.

12. In a compound thermal relay for controlling an electrical circuit, a casing, a heat insulating wall in the casing dividing same into first and second compartments and said wall having an opening, an electrically operative source of radiant heat in the first compartment, an energizing circuit for said heat source, a shrouded reflector enclosing said heat source on all sides except one which opens toward said opening to direct a beam of radiant heat through the opening and into said second compartment, a pair of bimetal thermal relay arms in said second compartment both exposed to and operated by heat from said opening and one having contacts controlling the electrical circuit and the other having contacts controlling the energizing circuit for the heat source, means for selectively interrupting the passage of heat through said opening, the said bimetal arms having differing responsiveness to the heat whereby the arm controlling the energizing circuit will periodically open that circuit to prevent the build-up of temperature in the other arm beyond the point necessary to operate same, and means venting the said second compartment to atmosphere for dissipating heat from that compartment.

13. A device of the character described for selectively connecting the high and low filaments of a motor vehicle headlight to the battery of the vehicle under influence of the light rays from another approaching vehicle, comprising a thermal relay of the single-pole double-throw type operatively connected to normally connect the high filament to the battery but on application of heat to disconnect said high filament and connect the low filament to the battery, a source of heat for operating said relay and including an energizing circuit, a light sensitive mechanism normally interrupting the application of heat to the relay but operative when exposed to said light rays to direct the heat upon the relay, a manually operative switch for selectively overriding the effect of the relay upon the low filament and constantly connecting said filament to the battery, and a second thermal relay connected in said energizing circuit and operated by the heat source and controlling the intensity of the heat developed thereby.

References Cited in the file of this patent

UNITED STATES PATENTS

| | | |
|---|---|---|
| 1,999,527 | Ronning | Apr. 30, 1935 |
| 2,237,579 | Ronning | Apr. 8, 1941 |
| 2,558,969 | Le Croy | July 3, 1951 |
| 2,598,420 | Onksen | May 27, 1952 |